United States Patent [19]

Brown

[11] 4,342,597

[45] * Aug. 3, 1982

[54] COATING COMPOSITIONS FOR LINERS OF MOLTEN METAL TROUGHS AND LADLES

[75] Inventor: William F. Brown, Colony, Tex.

[73] Assignee: Weston Research Corporation, Rothschild, Wis.

[*] Notice: The portion of the term of this patent subsequent to Mar. 16, 1999, has been disclaimed.

[21] Appl. No.: 241,060

[22] Filed: Mar. 6, 1981

[51] Int. Cl.³ .............................................. B28B 7/36
[52] U.S. Cl. ............................. 106/38.27; 106/38.22; 501/105; 501/107; 501/129; 501/133
[58] Field of Search ................... 106/38.22, 38.27, 57, 106/68, 69; 501/105, 107, 129, 133

[56] References Cited

U.S. PATENT DOCUMENTS

| | | | |
|---|---|---|---|
| 1,886,249 | 11/1932 | Bensing | |
| 2,544,598 | 3/1951 | Kalina | 22/136 |
| 3,059,296 | 10/1962 | North | 22/193 |
| 3,243,397 | 3/1966 | Herkimer et al. | 260/29.3 |
| 3,436,235 | 4/1969 | Baer et al. | 106/38.3 |
| 3,447,936 | 6/1969 | Ornitz | 106/38.27 |
| 3,859,153 | 1/1975 | Beyer et al. | 106/38.27 |

*Primary Examiner*—Lorenzo B. Hayes
*Attorney, Agent, or Firm*—Michael, Best & Friedrich

[57] ABSTRACT

A composition for coating the refractory liners of ladles and troughs for pouring and/or conveying molten metals comprising an aqueous dispersion containing finely divided zirconia, a colloidal silica, finely divided mica, finely divided zircon, finely divided bentonite and, optionally, an inert coloring agent. The coating composition is capable of re-bonding fractured liners and the resulting coating prolongs the effective life of the liner and exhibits superior reflectivity, causing the molten metal to retain its heat which facilitates better pouring.

5 Claims, No Drawings

COATING COMPOSITIONS FOR LINERS OF MOLTEN METAL TROUGHS AND LADLES

BACKGROUND OF THE INVENTION

This invention relates to coatings for the liners of ladles, troughs and the like used in handling molten metals.

Ladles and troughs for pouring and/or conveying molten metals usually have a refractory lining which must be repaired or replaced periodically. Coating compositions capable of providing a protective overcoating for such linings are desirable for the purpose of prolonging life of the liners.

Coating compositions containing refractory ingredients have been used to coat the molding surfaces of metal molds used for casting metal parts. Examples of such mold coating compositions are disclosed in U.S. Pat. Nos. 1,886,249 (Bensing), 2,544,598 (Kalina), 3,243,397 (Herkimer et al.), 3,436,235 (Baer), and 3,447,936 (Ornitz). Examples of other compositions containing refractory ingredients and used for different metal molding applications are disclosed in U.S. Pat. Nos. 3,059,296 (North) and 3,859,153 (Beyer et al.). None of these compositions are particularly effective as a protective overcoating for refractory liners of ladles and troughs.

SUMMARY OF THE INVENTION

One of the principal objects of the invention is to provide a composition for coating the refractory liners of ladles and troughs for pouring and/or conveying molten metals and producing a protective overcoating capable of withstanding repeated pourings of molten metal at elevated temperatures up to 3,800° F. and higher and thereby prolong the effective life of the liner.

Another of the principal objects of the invention is to provide such a coating composition which is capable of re-bonding fractured liners and producing a smooth-surfaced overcoating which minimizes the retention of slag and/or metal when the ladle or trough is emptied.

A further of the principal objects of the invention is to provide such a coating composition capable of producing a protective overcoating having superior heat reflection properties, causing the molten metal to retain its heat for a longer time during transit.

Other objects, aspects and advantages of the invention would become apparent to those skilled in the art upon reviewing the following detailed description and the appended claims.

The coating composition provided by the invention is an aqueous suspension containing about 20 to about 50 weight % finely divided zirconia, about 25 to about 40 weight % colloidal silica, about 5 to about 15 weight % finely divided mica, about 5 to about 25 weight % finely divided zircon, about 0.5 to about 5 weight % finely divided bentonite, 0 to about 3 weight % of an inert coloring agent, and about 5 to about 20 weight % water.

DESCRIPTION OF THE PREFERRED EMBODIMENT

The coating composition of the invention can be applied over refractory liners of ladles and troughs for pouring and/or conveying a variety of molten metals including cast iron, gray iron, steel, brass, bronze, copper, aluminum and stainless steel. The coating composition is quick setting and is capable of bonding fractured liners. The resulting overcoating is capable of providing temperature protection after repeated pours of molten metal at temperatures of up to 3,800° F. and higher, thereby extending the effective life of the liner for several weeks in some cases. The overcoating has a unique ability to reflect heat, causing the molten metal to retain its heat for a longer time which means that good pouring can be obtained with less reheating. The surface of the overcoating can be smoothed during the application to a degree which minimizes the retention of slag and/or metal when the ladle or trough is emptied.

While the theory by which the coating composition of the invention functions to provide the above and other advantageous properties is not fully understood, some observations have been made. Unless noted otherwise, the weight percentages disclosed below are based on the total weight of all the ingredients in the coating composition.

Zirconia provides the coating composition with refractory properties and enhances the heat insulating properties of the resulting overcoating so it can provide temperature protection when exposed to molten metals at temperatures up to 3,800° F. and higher. The zirconia is in finely divided or comminuted form, preferably at least the majority of particles being −325 mesh. The amount of zirconia is about 20 to about 50, preferably about 25 to about 35, weight %.

To enhance the smoothability of the overcoating surface and maintain high heat insulative properties and still minimize costs, a mixture of a lower purity zirconia, such as Insuloxide (contains approximately 95% $ZrO_2$) marketed by NL Industries of Highstown, N.J., and a finer, higher purity zirconia, such as Electrically Fused Zirconia Oxide 441 (contains approximately 99% $ZrO_2$) marketed by TAM Ceramics of Niagra Falls, N.Y., is preferred. When such a mixture is used, the amount of lower purity zirconia can be about 5 to about 20, preferably about 7 to about 17, weight % and the amount of the higher purity zirconia can be about 15 to about 30, preferably about 17 to about 25 weight %.

Finely divided zircon (zirconium silicate) particles, i.e., at least a majority −325 mesh, usually are rounded and polished and, therefore, further enhance the smoothability of the overcoating. Zircon also enhances the heat insulating properties and compressive strengths of the overcoating. The amount of zircon used is about 5 to about 25, preferably about 10 to about 20, weight %.

Mica, while considerably less less expensive than zirconia and zircon, enhances the heat insulation properties of the overcoating because of a low thermal conductivity and improves the reflectivity of radiant heat. The amount of mica used is about 5 to about 15, preferably about 7 to about 12, weight %.

The colloidal silica serves primarily as a binder for the refractory ingredients of the coating composition and promotes adherence of the overcoating to the liner surfaces. It has been found that the coating composition can be used to bond fractured refractory liners and repair chips because of an unique ability to bond to itself. Various colloidal silica compositions conventionally used in investment casting and the like can be employed. Representative suitable commercially-available colloidal silica compositions include the Ludox aquasols marketed by DuPont, particularly Ludox HS-40%, the Syton aquasols marketed by Monsanto Chemical and the Nalcoag aquasols marketed by Nalco Chemical. The amount of colloidal silica used is about 25 to about 40, preferably about 27 to about 35, weight %. Coating compositions containing colloidal silica compositions less than about 25 weight % generally do not bond adequately to refractory liners.

Bentonite serves primarily as an aid in maintaining the refractory ingredients suspended in the water carrier. Excessive amounts of bentonite can unduly reduce the compressive strength and heat resistance of the resulting overcoating. The amount of bentonite used is about 0.5 to about 5, preferably about 1 to about 3, weight %.

The inclusion of an inert coloring agent, such as W-4123 Phthalocyanine Blue (an aqueous suspension of phthalocyanine blue containing 35-37 weight & solids) marketed by Harshaw Chemical, provides the coating composition with a distinctive color which permits the applicator to more easily determine surface smoothness of the overcoating during application. When used, the amount of the coloring agent can be up to about 3 weight % and preferably is about 0.01 to about 2 weight %. The color can be of a shade, such as light blue, which brightens the interior of the ladle or trough and makes it still easier for the applicator to detect rough surface areas which might promote slag or metal deposits. Other suitable coloring agents can be used, such as W-3247 Burnt Umber (an aqueous dispersion of burnt umber containing 50-52 weight % solids) marketed by Harshaw Chemical.

The amount of water used in the coating composition depends on the particular coating technique employed. In any event, the amount of water used is about 5 to about 20, about 7 to about 15, weight %. If the amount of water is above about 20 weight % the coating composition is too fluid or runny to obtain an overcoating of the desired thickness. On the other hand, if the amount of water is below about 5 %, the coating composition becomes so thick it cannot be conveniently applied as a uniform, smooth-surfaced overcoating.

The coating composition can be prepared by any suitable procedure whereby the ingredients are uniformly dispersed throughout. For example, all the liquid-containing ingredients, including the collateral silica, the coloring agent and water, can be added to a high speed blender and pre-mixed. The solid ingredients can be added to the pre-blended liquid ingredients in any sequence and the resultant mixture blended for a time sufficient to provide the desired dispersion.

The coating composition can be applied in any suitable manner, such as brushing, wiping, troweling or spraying, capable of providing a smooth overcoating of substantially uniform thickness over the surface of the liner. Generally, an overcoating thickness on the order of about ⅜ to ½ inch is sufficient. The overcoating preferably should be built up more in the areas bearing the force of the pouring molten metal.

The coating composition preferably is applied over refractory liners at a temperature of about 100° to about 450° F. The coating composition can be applied while the ladle or trough is still warm from use or after the ladle or trough had been preheated. In any case, the temperature of the liner should not exceed 450° F. After a buildup of about ⅜ to about ½ inch, the overcoating is heated to a temperature up to 450° F. for at least 30 minutes to remove or "bake out" all, or substantially all, the moisture prior to pouring a molten metal into the ladle or trough.

If the coatings are applied too thick or dried too rapidly, superficial surface cracks may occur. This can be corrected by simply applying a thin finish coat to fill the cracks. As alluded to above, the coating composition can be used to re-bond fractured liners. This is accomplished by working the coating composition into the cracks. Additional layers of the coating composition can be applied periodically over an existing overcoating, after removal of slag and/or metal deposits, to further increase the effective life of the liner.

Without further elaboration, it is believed that one skilled in the art can, using the preceeding description, utilize the present invention to its fullest extent. The following example is presented to exemplify a preferred embodiment of the invention and should not be construed as a limitation thereof.

EXAMPLE

A coating composition having the following composition has been found to yield excellent results when applied to the refractory liners of ladles and troughs used in pouring and/or conveying a variety of molten metals:

| Ingredient | Weight, lbs. | Weight % |
|---|---|---|
| Low purity zirconia (1) | 90 | 10.99 |
| High purity zirconia (2) | 154 | 18.80 |
| Colloidal silica (3) | 225 | 31.13 |
| Mica | 95 | 11.60 |
| Zircon (4) | 131 | 16.00 |
| Bentonite | 13.75 | 1.68 |
| Colorint agent (5) | 0.25 | 0.03 |
| Water | 80 | 9.77 |
| | 819.0 | 100.0 |

Notes:
(1) Insuloxide (94.72% $ZrO_2$, 2.18 max. % retained on 325 mesh sieve) marketed by NL Industries.
(2) Electrically Fused Zirconium Oxide 441 (98.63% $ZrO_2$, 1.5% retained on 325 mesh sieve) marketed by TAM Ceramics.
(3) Ludox HS-40% (aqueous colloidal dispersion, 40 weight % silica as $SiO_2$) marketed by DuPont.
(4) Zircon G (98% zirconium silicate) marketed by National Lead.
(5) W-4123 Phthalocyanine Blue (aqueous dispersion, 34-37 weight % solids) marketed by Harshaw Chemical.

The resulting suspension has a light blue color, has a Baume' density of about 79, does not freeze at temperatures above about 0° F. and has been found to remain stable after several months of on-shelf storage. The resultant coating is non-flammable and provides excellent temperature protection for liners exposed to molten metal at temperatures as high has 3,400°-3,800° F. In many cases, the effective life of liners for ladles and troughs can be prolonged 2-5 weeks with a resultant saving in material and labor costs. An overcoating of the coating composition has a superior ability to reflect heat, causing the molten metal to retain its heat for a longer time during transit and thereby assuring better pouring with less energy for reheating.

From the foregoing description, one skilled in the art can easily ascertain the essential characteristics of the invention and, without departing from the spirit and scope thereof, can make various changes and modifications to adapt it to various usages and conditions.

I claim:

1. A composition for coating the refractory liners of ladles and troughs for handling molten metals comprising an aqueous suspension containing about 20 to about 50 weight % finely divided zirconia, about 27 to about 35 weight % colloidal silica, about 5 to about 15 weight % mica, about 5 to about 25 weight % finely divided zircon, about 0.5 to about 5 weight % bentonite, 0 to about 3 weight % of an inert coloring agent, and about 5 to about 20 weight % water.

2. A coating composition according to claim 1 containing about 25 to about 35 weight % of said zirconia, about 7 to about 12 percent of said mica, about 10 to about 20 weight % of said zircon, about 1 to about 3 weight % of said bentonite, and about 7 to about 15 weight % water.

3. A coating composition according to claim 2 containing about 0.01 to about 2 weight % of said coloring agent.

4. A coating composition according to claim 1 containing about 5 to about 20 weight % of a low purity zirconia and about 15 to about 30 weight % of a high purity zirconia.

5. A coating composition according to claim 4 containing about 7 to about 17 weight % of a low purity zirconia and about 17 to about 25 weight % of a high purity zirconia.

* * * * *